March 31, 1959  E. A. McLAIN  2,879,895
BAFFLE SYSTEM FOR CONTINUOUS FLOW SETTLING TANKS
Filed Feb. 6, 1956  2 Sheets-Sheet 2

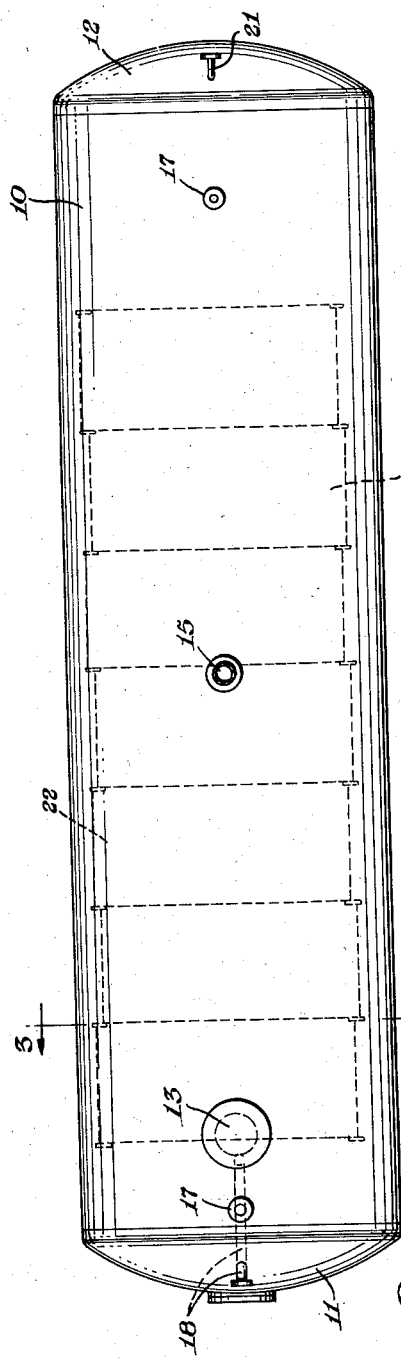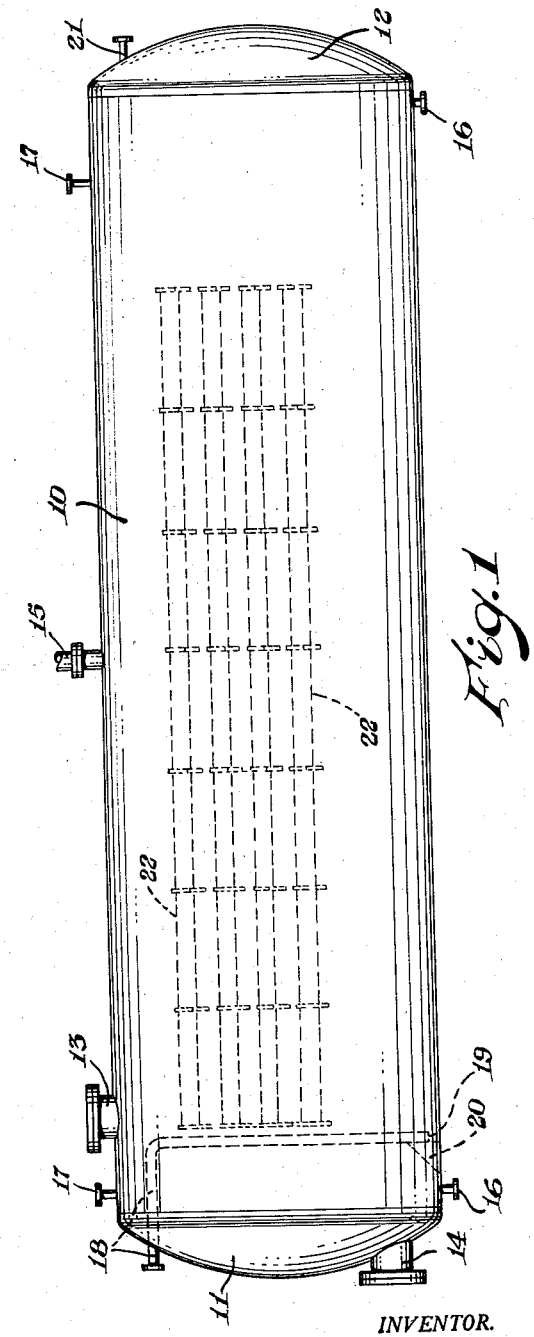

INVENTOR.
Earl A. McLain
BY
Griswold & Burdick
ATTORNEYS

United States Patent Office 2,879,895
Patented Mar. 31, 1959

2,879,895

BAFFLE SYSTEM FOR CONTINUOUS FLOW SETTLING TANKS

Earl A. McLain, Concord, Calif., assignor to The Dow Chemical Company, Midland, Mich., a corporation of Delaware Application February 6, 1956, Serial No. 563,516

1 Claim. (Cl. 210—521)

This invention relates to a baffle system for use in settling tanks through which there is maintained a flow of liquid which enters the tanks carrying suspended solid matter and leaves the tank in a relatively clarified condition. It relates in particular to such a system in tanks handling a stream of corrosive material, and more especially it is concerned with baffles for use in settling tanks to which is fed a warm stream of alkylbenzene carrying suspended particles of corrosive aluminum chloride complex from a Friedel-Crafts alkylation reaction.

The problem which gave rise to the invention exists in a process for the manufacture of styrene from ethylbenzene. As practiced commercially, benzene is caused to react with ethylene in the presence of aluminum chloride. The resulting ethylbenzene is separated from any large particles of the catalyst complex, but carries with it as it leaves the reactor suspended fine particles of aluminum chloride and organic complexes thereof. These must be removed before the ethylbenzene can be converted to styrene in the usual catalytic dehydrogenation reaction, because the presence of any chlorides poisons the dehydrogenation catalyst. The undesired contaminants can be removed by washing the ethylbenzene, or "alkylate" stream with aqueous alkali. If the quantity of aluminum compound in the alkylate is very great, several difficulties arise in the washing step. Thus, there may be excessive consumption of the alkali, or there may be formed a gelatinous precipitate which cannot be separated easily from the alkylate. For these and other reasons it is desidable to effect nearly complete removal of the suspended particles from the alkylate before it is washed.

It has been the practice to pass the warm alkylate through a settling tank, in attempts to reduce the burden of solids in that stream. In an unbaffled tank, stratification soon occurs due to the density gradient created when the alkylate cools. As a result, the fresh alkylate, being warmest, tends to flow across the top of the body of liquid in the tank. Hence, instead of being exposed to quiescent conditions conducive to settling, the fresh warm alkylate passes through the tank at an unintended high velocity, carrying nearly as much of the suspended solids out of the tank as it brought in. To overcome this difficulty, attempts have been made to provide baffles in the tank to arrest the flow of liquid and to prevent stratification. These have not been successful in the past, either because the baffles caused turbulence at the very points where the liquid should be nearly still, or more commonly because the cheapest baffles, being made of common boiler plate, were corroded away after a short useful life. These and related problems have indicated the need for an improved baffle system for alkylate settling tanks, and it 's the principal object of this invention to provide such an improvement.

The present invention comprises a horizontally disposed cylindrical tank; an inlet pipe constituting a sparger disposed vertically in and near one end of the tank and having a plurality of openings for discharge of liquid at several levels in the tank, but spaced from the bottom thereof; a discharge port for clarified liquid near the top of the tank and near its other end; a bottom outlet for settled sludge; and a plurality of baffles of inert material disposed within the tank, extending transversely in vertically spaced and longitudinally contiguous tiers from near one side to near the opposite side of the tank, each canted at an angle of from about 1° to 5° from the horizontal, the baffle assembly extending from near the inlet sparger most of the distance toward the discharge end of the tank; the openings in said sparger being located so as to discharge entering liquid primarily into the spaces between the tiered baffles. The term "sparger" is used in many industries to designate a perforated pipe which is commonly submerged in a liquid and which is used to supply a fluid, either a gas or a liquid, in multiple streams to the existing body of liquid. Because of similarity of structure and function, the perforated inlet pipe described herein and which discharges multiple streams of liquid into the apparatus here-concerned, is referred to herein as a sparger. The apparatus will be described in greater detail with reference to the embodiment shown in the accompanying drawing, wherein Fig. 1 is an elevation of the baffled tank of the invention, showing by phantom lines the tiered baffles and the inlet sparger;

Fig. 2 is a plan view of the same tank;

Figure 3:
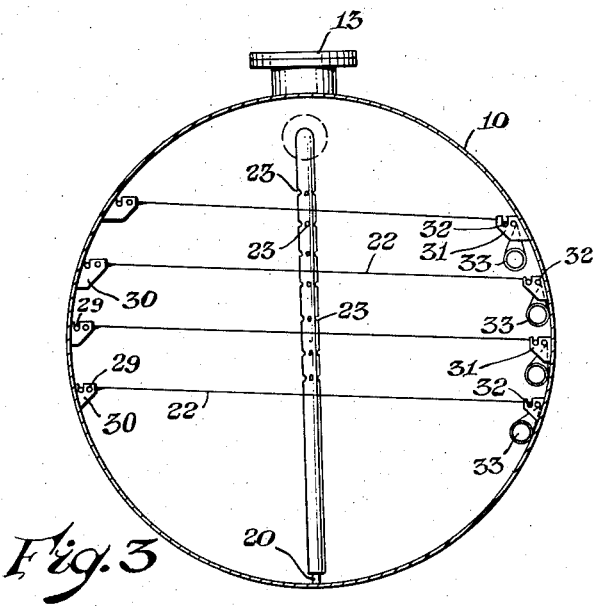
Fig. 3 is a transverse section through the tank, taken along line 3—3 of Fig. 2.
Figure 5:
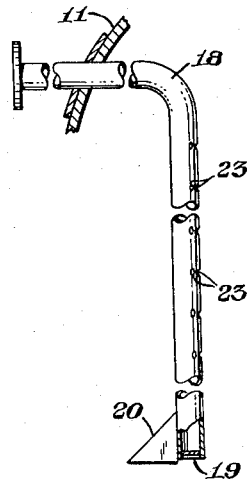
Fig. 5 shows in detail some features of a preferred embodiment of the sparger.

In a typical embodiment shown in the drawings, an alkylate settling tank 10 is of cylindrical construction and is disposed with its axis horizontal. The length of the illustrated tank, excluding the dished heads 11, 12, is 3.5 times its diameter. The tank 10 is illustrated as having manholes 13, 14, a frangible safety valve 15, drains 16, and flanged pipe connections 17 appropriate to the assembly in which the tank was used. These features, of themselves, do not constitute part of the invention. The inlet sparger pipe 18 is shown as entering tank 10 horizontally through the upper portion of the midline of head 11, and as turning downward to a vertical position, extending nearly to the bottom of the tank and having its closed end 19 supported movably in the tank as by a gusset or bracket 20. An outlet pipe 21 is provided in the upper midline of head 12. Disposed transversely across the tank is a plurality of tiered baffles 22 which, as shown in Figs. 1 and 2, extend from near the sparger 18 about 80 percent of the distance to the outlet end of the tank and, as shown in Fig. 3 are disposed parallel to one another and canted a few degrees from the horizontal. The lowest baffle 22 is located a considerable distance above the bottom of tank 10 to allow room for the accumulation of settled sludge. As illustrated, this distance may be of the order of 0.25 to 0.45 times the diameter or depth of the tank. The uppermost baffle 22 may be positioned from 0.1 to 0.3 times the diameter from the top of the tank. Sparger 18 is provided with orifices 23 in that portion of its length which is opposite tiered baffles 22 and the spaces between them, but is otherwise essentially free from perforations or outlets.

Figure 4:
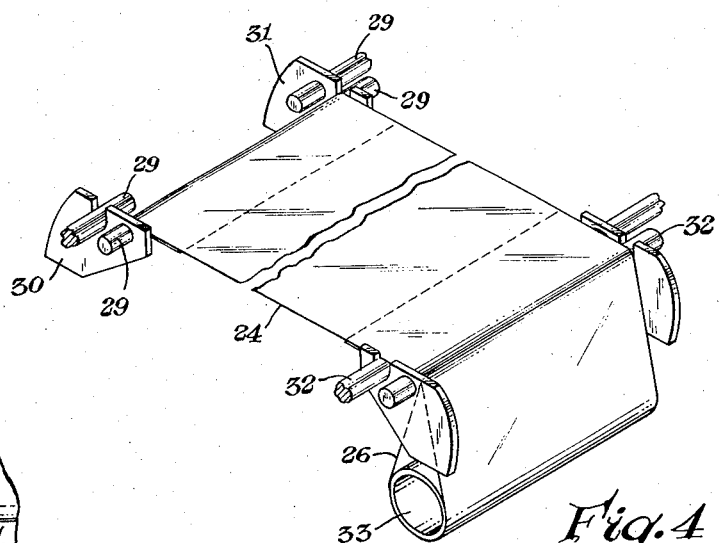
Fig. 4 is an isometric view of one baffle element and typical supporting brackets for that and the adjacent elements.
Figure 7:
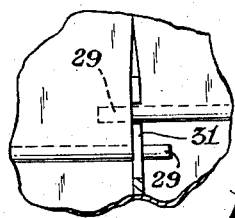
Figure 6:
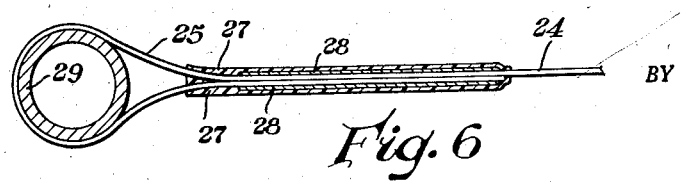
Fig. 6 is an enlarged section showing a preferred method of mounting the baffle material on rigid rods or like end elements; and, Fig. 7 is a fragmentary plan view, in partial section, showing the relation between the baffles and their mountings and the shell of the tank.

The preferred baffles 22, because of their inertness to many chemicals, are made of glass cloth, though other fabrics may be used which are unaffected by a particular liquid to be treated. As shown most clearly in Figs. 4 and 6, a length of the inert fabric 24 greater than required to span the tank is folded back on itself at both ends to form loops 25, 26. With some fabrics, these loops may be formed by sewing, but it is preferable with glass cloth to use an adhesive cement, such as an epoxy resin adhesive, between the opposed surfaces, and to secure a facing strip 27 of inert plastic such as polyethylene to each side of the assembly to confine the adhesive 28 while the latter is in the liquid condition. A rigid rod, tube or pipe 29, of length greater than the width of the fabric sheet 24 is inserted in loop 25, and that rod 29 is mounted in brackets 30, 31 secured along one side of the inner wall of tank 10. Similar brackets are mounted on the opposite inner wall of tank 10, at a lower level to provide a slope of from 1° to 5° when the sheet element 24 of baffle 22 is stretched in place. Rigid guide rods 32 are mounted in these latter brackets 30, 31, and the end of the fabric 24 having loop 26 therein is fed over rod 32 and downwardly between that rod and the wall of the tank. A rigid rod or like element to serve as a counterweight 33 is finally inserted in loop 26, and the so-tautened sheet becomes a transverse baffle sloping down toward the weighted end of the fabric, but spaced a sufficient distance from the tank wall to permit sediment which is deposited on the baffle to migrate along the tank wall to the static reservoir at the bottom. Enough of these baffle elements are mounted one above another to provide the desired number of flow channels, and, at each level, enough of them are placed side by side to make the flow channels of sufficient length to effect predictably satisfactory dropout of suspended sediment carried into the tank. To permit close side by side disposition of a series of baffles 22, the illustrated brackets 30, 31 are very effective, but these are shown only by way of example since other holders may be used with equal satisfaction.

The counterweighted fabric baffles remain taut regardless of temperature changes in the surrounding liquid medium, and they are free from the danger of tearing which would threaten the life of fabrics firmly secured to both walls of the tank.

The need for a long and uniform residence time in the settling tank, in order to effect significant reduction in the aluminum chloride content of a warm ethylbenzene alkylate, is apparent from the data in the following table. Samples of fresh alkylate were held for the indicated periods of time at 40° C., and the amount of aluminum chloride in the supernatant liquid was determined.

| Settling time, hours | Aluminum chloride, percent |
|---|---|
| 0 | 0.163 |
| 1 | 0.144 |
| 2 | 0.132 |
| 3 | 0.125 |
| 4 | 0.124 |
| 5 | 0.117 |
| 6 | 0.116 |
| 7 | 0.102 |

Accordingly, it is deemed necessary to avoid any short-circuiting of the warm liquid through the tank if a significant reduction in its chloride content is to be realized.

In a plant for the commercial production of ethylbenzene, two settling tanks for alkylate were used in series. Typical analyses of the aluminum chloride content of the effluent liquor from each tank were made for several weeks before, and for several weeks after the new baffles were installed. The results appear below, expressed as percent aluminum chloride.

*Tank 2 Effluent*

| Unbaffled | New baffles |
|---|---|
| 0.13 | 0.10 |
| 0.12 | 0.12 |
| 0.13 | 0.11 |
| 0.17 | 0.11 |
| 0.13 | 0.13 |
| 0.14 | 0.10 |
| 0.15 | 0.11 |
| 0.14 | 0.13 |
| 0.14 | 0.13 |
| 0.13 | 0.09 |
| 0.13 | 0.12 |
| 0.14 | 0.12 |
| 0.13 | 0.13 |
| 0.13 | 0.10 |
| 0.12 | 0.10 |
| 0.12 | 0.13 |
| 0.12 | 0.10 |
| 0.13 | 0.11 |
| Ave. 0.133 | Ave. 0.113 |

It is noted that there was much less fluctuation in the concentration of chloride in the effluent from the new baffled tanks, and that the chloride concentration was about 15 percent lower in that liquor. This gave much more satisfactory operations in the subsequent stages of the process.

I claim:

Apparatus for settling suspended solid particles from moving liquids comprising a horizontally disposed cylindrical tank; an inlet pipe disposed vertically in and near one end of the tank; a discharge port for clarified liquid near the top of the tank and near its other end; means for removing settled sludge from the tank; and a plurality of baffles of glass cloth disposed within the tank, extending transversely in vertically spaced and longitudinally contiguous parallel tiers from near one side to near the opposite side of the tank, each baffle being secured near one side of the tank and maintained taut by a counterweight at the other and lower end near the opposite wall of the tank and being canted at an angle of from about 1° to 5° from the horizontal and spaced a sufficient distance from the tank wall to permit sediment deposited on said baffle to migrate along the tank wall toward the bottom of the tank, the baffle assembly extending from near the inlet pipe most of the distance toward the discharge end of the tank; said inlet pipe being provided with openings so located as to discharge entering liquid primarily on the several baffles in the nearest tier.

References Cited in the file of this patent

UNITED STATES PATENTS

| 1,327,944 | Cosler | Jan. 13, 1920 |
| 1,864,911 | Jodeck | June 28, 1932 |
| 2,793,186 | Dunell et al. | May 21, 1957 |

FOREIGN PATENTS

| 407,374 | Germany | Dec. 19, 1924 |

OTHER REFERENCES

Perry: 3rd edition, Chem. Eng. Handbook, McGraw-Hill 1950.